United States Patent [19]

Fantone et al.

[11] Patent Number: 4,921,316

[45] Date of Patent: May 1, 1990

[54] INTEGRAL FIBER OPTIC PRINTHEAD

[75] Inventors: Stephen D. Fantone, Lynnfield; Bennett H. Rockney, Westford; Robert J. Burger, Newton Centre; Lee M. Cook, Spencer, all of Mass.

[73] Assignees: Polaroid Corporation, Cambridge; Galileo Electro-Optics Corporation, Sturbridge, both of Mass.

[21] Appl. No.: 319,612

[22] Filed: Mar. 6, 1989

[51] Int. Cl.[5] .......... G02B 6/08; H04N 1/21; G01D 15/06

[52] U.S. Cl. .......... 350/96.27; 358/302; 346/155

[58] Field of Search .......... 346/155, 107 R, 160; 358/302; 350/96.27

[56] References Cited

U.S. PATENT DOCUMENTS

| | | | |
|---|---|---|---|
| 4,179,596 | 12/1979 | Bjork | 219/10.55 M |
| 4,279,483 | 7/1981 | England et al. | 354/4 |
| 4,447,126 | 5/1984 | Heidrich et al. | 350/96.31 |
| 4,482,214 | 11/1984 | Hill et al. | 350/355 |
| 4,525,729 | 6/1985 | Agulnek et al. | 346/154 |
| 4,574,317 | 3/1986 | Scheible | 346/143 X |
| 4,589,732 | 5/1986 | Shiraishi et al. | 350/331 R |
| 4,590,492 | 5/1986 | Meier | 346/107 R |
| 4,715,682 | 12/1987 | Koek et al. | 350/253 |
| 4,740,803 | 4/1988 | Hardy | 354/80 |
| 4,750,799 | 6/1988 | Kawachi et al. | 350/96.11 |
| 4,752,806 | 6/1988 | Haas et al. | 355/3 R |
| 4,767,172 | 8/1988 | Nichols et al. | 350/96.18 |
| 4,837,587 | 6/1989 | Ng | 346/108 |

OTHER PUBLICATIONS

A New LSI Bonding Technology, "Micron Bump Bonding Assembly Technology", by K. Hatada et al., 5th IEEE/CHMT International Electronic Manufacturing Technology Symposium–Design-to-Manufacturing Transfer Cycle, Proceedings Date: 10–12 Oct. 1988, pp. 23–27.

New Technology, "Insulation Resin Bonding-Chip on Substrate Assembly Technology", by Kenzo Hatada et al., Semiconductor Research Center, Matsushita Electric Industrial Co., Ltd.

*Primary Examiner*—John D. Lee

*Assistant Examiner*—Akm Ullah

*Attorney, Agent, or Firm*—Edward S. Roman

[57] ABSTRACT

An intgeral printhead includes a single fiber optic faceplate substrate to which are connected light emitting diode arrays, driver circuits for selectively controlling the energization of the light emitting diodes and interconnecting conductive lines all disposed on the same fiber optic faceplate substrate which thereby provides the optical lens system for the light emitting diodes and a supporting substrate to which the active components are mounted and electrically interconnected by the conductive lines.

5 Claims, 1 Drawing Sheet

INTEGRAL FIBER OPTIC PRINTHEAD

BACKGROUND OF THE INVENTION

1. Field of the Invention

This invention relates generally to an integral fiber optic printhead and, more particularly, to a printhead comprising a single fiber optic faceplate substrate.

2. Description of the Prior Art

Light emitting diode arrays are well known in the art for recording an image on a photosensitive medium such as a photographic film or paper or, alternatively, a photocopying receptor such as a selenium drum or a zinc oxide paper. In order to achieve high resolution, a large number of light emitting diodes are arranged in a linear array and means are included for providing a relative movement between the linear array and the photosensitive medium so as to effect a scanning movement of the linear array over the surface of the photosensitive medium. Thus, the photosensitive medium may be exposed to provide a desired image one line at a time as the LED array is advanced relative to the photosensitive medium either continuously or in a stopping motion. Each LED in the linear array is used to expose a corresponding pixel in the photosensitive medium to a value determined by image defining electronic signal information. Since the light emitted from each LED rapidly diverges upon emission from the diode, an optical system is needed to transmit the light from the LED to the surface of the photosensitive medium without substantial divergence. One such proposed optical system for use in such a printhead comprises an array of graded index lenses made up of closely packed rows of optical fibers as disclosed in U.S. Pat. No. 4,447,126, entitled "Uniformly Intense Imaging by Close Packed Lens Array", by P. Heidrich et al., issued May 8, 1984. Another apparatus disclosed for mounting an imaging lens array formed of a plurality of gradient index optical fibers onto a printhead having a linear array of light emitting diodes is suggested by U.S. Pat. No. 4,715,682, entitled "Mount for Imaging Lens Array on Optical Printhead", by K. Koek et al., issued Dec. 29, 1987. Although arrays of gradient index optical fibers have been suggested for use as the imaging lens in such printheads, critical alignment and assembly problems still exist so as to effect the precise connection between the optical fiber array and the LED array. Not only must the LED arrays be precisely aligned to the optical fiber arrays but electrical connections must also be made from remotely stationed control circuits which modulate the current furnished to drive the LED's during exposure.

Therefore, it is a primary object of this invention to provide an integral printhead structure in which LED arrays and the driver circuits therefor can be mounted on a singular substrate.

It is a further object of this invention to provide an integral printhead structure in which light emitting diode arrays are more easily connected to a fiber optic lens array which can further act as a substrate to accommodate the mounting and connection of additional support circuitry.

Other objects of the invention will be in part obvious and will in part appear hereinafter. The invention accordingly comprises a structure and system possessing the construction, combination of elements and arrangement of parts which are exemplified in the following detailed disclosure.

SUMMARY OF THE INVENTION

Apparatus for selectively exposing a plurality of longitudinally spaced areas across the face of a photosensitive medium comprises an elongated coherent fiber optic faceplate substrate. The fiber optic faceplate has a substantially planar light receiving surface oppositely spaced apart with respect to a substantially planar light emitting surface. The light emitting surface is stationed to accommodate the close proximity placement of the photosensitive medium to receive the light emitted therefrom. There is also provided at least one elongated array comprising a plurality of light emitting diodes. Each of the light emitting diodes is closely spaced with respect to an adjacent diode and has a light emitting surface fixedly stationed in close light transmitting proximity to the light receiving surface of the fiber optic faceplate. Conductive interconnecting lines are selectively deposited on the light receiving surface of the fiber optic faceplate to accommodate select electrical connection to the light emitting diodes. Means are also provided for electrically connecting the light emitting diodes to select ones of the conductive interconnecting lines. There are also preferably provided a plurality of drive control circuits for controlling the energization of the light emitting diodes. The drive control circuits are also fixedly stationed with respect to the light receiving surface of the fiber optic faceplate in spaced relation with respect to the light emitting diodes. There are also provided means for electrically connecting the driver control circuits to select ones of the conductive interconnecting lines. In the preferred embodiment, the means for electrically connecting the light emitting diodes and the driver control circuits to selected ones of the conductive interconnecting lines comprises connections made by the so-called flip chip/solder bumping process.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in conjunction with the accompanying drawings wherein:

DESCRIPTION OF THE PREFERRED EMBODIMENT

Figure 1:
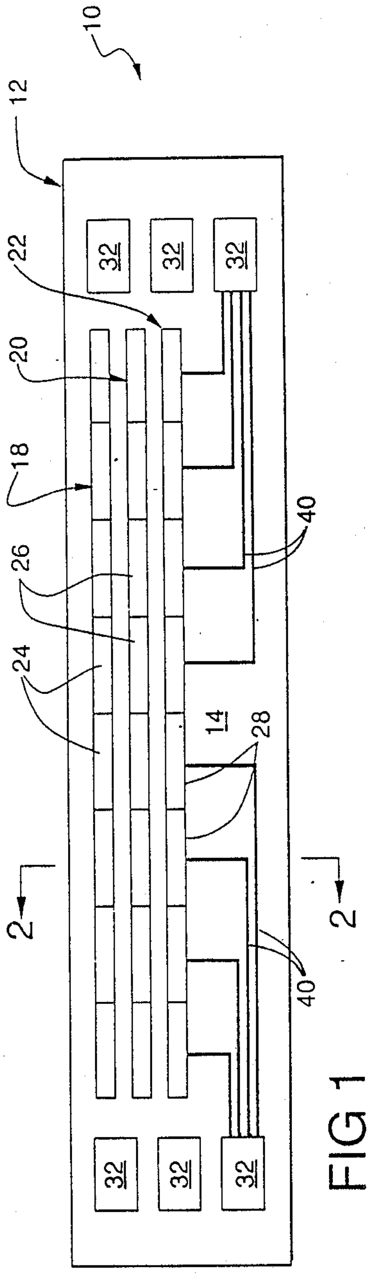
FIG. 1 is a plan view of the integral fiber optic printhead of this invention.
Figure 2:
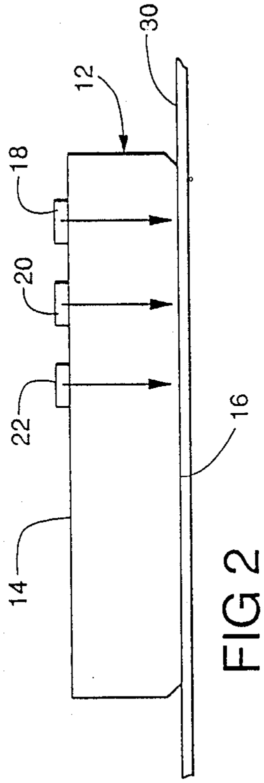
FIG. 2 is a cross-sectional view taken across the lines 2—2 of FIG. 1.
Figure 3:
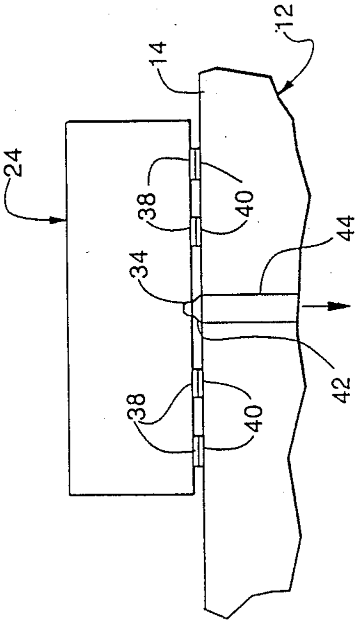
FIG. 3 is an enlarged cross-sectional view showing a portion of the integral fiber optic printhead of FIG. 1.

Referring now to FIGS. 1–3, there is shown at 10 the printhead assembly of this invention comprising a fiber optic faceplate 12. The fiber optic faceplate 12 is configured in an elongated parallelepiped shape having a substantially planar light receiving surface 14 in spaced parallel relation to a substantially planar light emitting surface 16. The fiber optic faceplate comprises a plurality of individual glass fibers which are stacked together, pressed and heated under pressure to form a uniform structure with a plurality of light transmitting passages extending between the light receiving and light emitting surfaces 14, 16. Fiber optic faceplates are well known in the art as taught in U.S. Pat. No. 4,179,596, entitled "Method For Processing Fiber Optic Electronic Components of Electronic Vacuum Device", by C. Bjork, issued Dec. 18, 1979, and now incorporated by reference herein. The above-described method is only exemplary, and it will be readily understood that other methods may also be utilized.

Disposed on the light receiving surface 14 of the fiber optic faceplate 12 are three elongated arrays 18, 20 and 22 comprising, respectively, pluralities of light emitting diodes (LED's) 24, 26 and 28 aligned in side-by-side relationship with respect to each other along the length of each respective array. Each of the LED's 24, 26 and 28 is preferably selected to emit radiation in one of three distinct wavelength ranges as for example red, blue and green. As will be well understood, other wavelength ranges could also be utilized. The LED's 24, 26 and 28 are of conventional construction well known in the art. A plurality of LED driver circuits 32 are also mounted on the light receiving surface 14 of the fiber optic faceplate 12. Driver circuits 32 are electrically connected to select ones of the LED's 24, 26 and 28 by means of conductive interconnecting lines 40. The conductive interconnecting lines 40 may comprise any suitably conductive metal such as gold, aluminum, etc. deposited on the light receiving surface 14 of the fiber optic faceplate 12 by any well-known technique such as sputtering or evaporation with the excess metallization being thereafter removed by well-known photoresist and etching techniques to provide selective interconnects between the LED's 24, 26 and 28 and respective ones of the driver circuits 32.

Referring specifically to FIG. 3, there is shown an enlarged cross-sectional view of one of the LED's 24. Light emitting diode 24 has metallized contacts as shown at 38 deposited in any well-known manner and a narrow central light emitting area as shown generally at 34. The metallized contacts 38 are electrically connected to respective ones of the conductors 40 by a conventional solder bumping process. The driver circuits 32 can be interconnected to respective ones of the conductors 40 by the same solder bumping process used to connect the LED's or by conventional wire bonding techniques. Since the electrical connections to the fiber optic faceplate substrate 12 are made on the underlying surface of the active elements, the connection technique is generally referred to as the flip chip/solder bumping process. Although the flip chip/solder bumping process is preferred for connecting the active components to selective conductors 40 on the fiber optic faceplate substrate 12, the invention is by no means so limited and other conventional techniques such as wire bonding may also be utilized.

During the operation of the printhead 10 of this invention, a photosensitive sheet 30 is moved relative to the light emitting surface 16 of the fiber optic faceplate substrate 12 to effect a raster line exposure thereof. The radiant energy emitted by the light emitting area of each diode 34 diverges slightly in the space 42 between the underlying surface of the light emitting area and the light receiving surface 14 of the fiber optic faceplate 12. Once incident to the light receiving surface 14 radiation is transmitted in a collimated beam 44 by the fused glass fibers of the fiber optic faceplate 12 until exiting from the light emitting surface 16 to expose the photosensitive sheet 30. As will be readily understood, the radiation emitted by the light emitting diodes 24, 26 and 28 are all transmitted in collimated beams 44 without substantial divergence by respective ones of the diffused optical fibers of the faceplate 12 to expose discrete pixel areas on the photosensitive sheet 30. Transmission of the radiation from the light emitting diodes without substantial divergence operates to contain the size of the discrete areas exposed on the photosensitive so that the resolution of the reproduced image is substantially determined by the size and spacing of the LED's 24. The driver circuits 32 operate to control or modulate the flow of current through respective ones of the LED's 24, 26 and 28 in a manner as is fully described in U.S. Pat. No. 4,525,729, entitled "Parallel LED Exposure Control System", by M. Agulnek et al., issued June 25, 1985, and now incorporated in its entirety by reference herein.

Thus, there is provided a simple and economical construction in which a single fiber optic substrate operates to transmit light from light emitting diode arrays in collimated beams to expose well-defined pixel areas of a photosensitive sheet while simultaneously providing a substrate onto which other conductors and LED driver circuitry may be deposited by standard techniques.

Other embodiments of the invention including additions, subtractions, deletions, and other modifications of the preferred disclosed embodiments of the invention will be obvious to those skilled in the art and are within the scope of the following claims.

What is claimed is:

1. Apparatus for selectively exposing a plurality of longitudinally spaced areas across the face of a photosensitive medium comprising:

an elongated coherent fiber optic faceplate substrate having a substantially planar light receiving surface oppositely spaced apart with respect to a substantially planar light emitting surface, said light emitting surface being stationed to accommodate the placement of the photosensitive medium in sufficiently close proximity thereto so that the photosensitive medium can receive the light emitted from said light emitting surface;

at least one elongated array comprising a plurality of light emitting diodes each of said light emitting diodes being selectively spaced with respect to an adjacent diode and having a light emitting surface fixedly stationed in effective light transmitting relation to the light receiving surface of said fiber optic faceplate;

conductive interconnecting lines selectively deposited on the light receiving surface of said fiber optic faceplate in a manner whereby said conductive interconnecting lines accommodate select electrical connection to said light emitting diodes; and means for electrically connecting said light emitting diodes to selected ones of said conductive interconnecting lines.

2. The apparatus of claim 1 further comprising a plurality of driver control circuits for controlling energization of said light emitting diodes, said driver control circuits being fixedly connected with respect to the light receiving surface of said fiber optic faceplate in spaced relation with respect to said light emitting diodes, by means for electrically connecting said driver control circuits to selected ones of said conductive interconnecting lines.

3. The apparatus of claim 2 wherein said means for electrically connecting said light emitting diodes and said driver control circuits to selected ones of said conductive interconnecting lines comprises connections made by the flip chip bonding process.

4. The apparatus of claim 3 comprising at least three elongated arrays of light emitting diodes each of said arrays aligned in substantially parallel spaced relation with respect to each other and capable of emitting radiation in one of three distinct wavelength ranges.

5. The apparatus of claim 2 wherein said fiber optic faceplate comprises a plurality of solid glass fibers extending longitudinally between said light receiving surface and said light emitting surface bonded together in a fused matrix.

* * * * *